Jan. 23, 1968 J. E. COTTLE 3,365,394
PROCESS FOR SEPARATION OF MIXED HYDROCARBONS BY ADSORPTION
Filed April 4, 1966
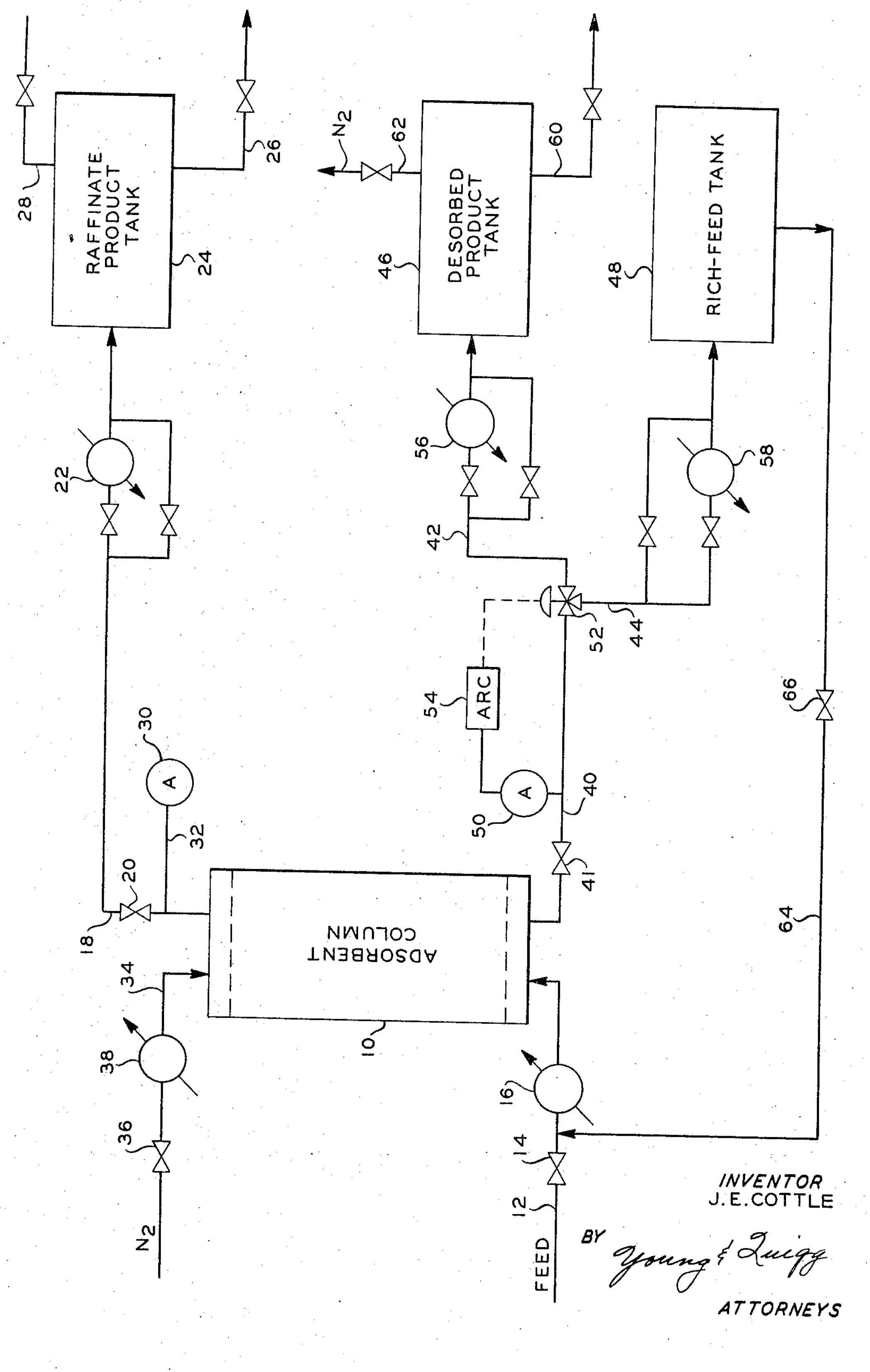
INVENTOR
J. E. COTTLE
BY Young & Quigg
ATTORNEYS United States Patent Office 3,365,394

Patented Jan. 23, 1968

3,365,394

PROCESS FOR SEPARATION OF MIXED HYDROCARBONS BY ADSORPTION

John E. Cottle, Bartlesville, Okla., assignor to Phillips Petroleum Company, a corporation of Delaware Filed Apr. 4, 1966, Ser. No. 539,819
9 Claims. (Cl. 208—310)

ABSTRACT OF THE DISCLOSURE

Improved separation of a mixture of fluid organic compounds A and B is effected in a fixed bed of adsorbent selective for component A by passing the fluid mixture thru the bed until the adsorbent is loaded with component A (at the respective concentrations of A and B), thereafter passing a similar feed mixture richer in component A thru the bed to increase the loading (concentration of A) in the adsorbent, and thereafter desorbing A from the adsorbent by passing a purge gas therethru, both components A and B being recovered during the operation. The feed mixture richer in A is preferably the effluent from the bed during the initial phase of the purge step during which the richer mixture plus some desorbed A comprise the effluent. A mixture of normal and branched chain hydrocarbons such as $C_{10}$ to $C_{16}$ n-paraffins and corresponding branched chain or cyclic hydrocarbons are illustrative of mixtures separable by the process.

This invention relates to an improved process for separating a mixture of organic compounds into separate streams of components by selectively adsorbing one component from the mixture and recovering the adsorbed component as one stream and the unadsorbed component as the other stream.

The separation of certain types of organic compounds from other types, such as hydrocarbons from a mixture thereof with other types of hydrocarbons, with suitable adsorbents is conventional practice. Aromatics are selectively adsorbed by silica gel, activated carbon, alumina, and the like, and are thus separable from non-aromatics either cyclic or acyclic with a selected adsorbent. In this manner, benzene, toluene, and xylenes are separated from petroleum naphtha streams using silica gel to recover the aromatic hydrocarbons. Also, straight-chain hydrocarbons are separable from non-straight-chain hydrocarbons using an effective adsorbent. It is conventional to recover normal paraffins from non-normal hydrocarbons such as branched-chain hydrocarbons with natural or synthetic zeolites as the adsorbent.

Zeolites, or molecular sieves as they are commonly called, are commercially available with selected, rather uniform pore sizes. Such molecular sieves are particularly adapted to use in the instant invention which is concerned with a more efficient method or process for making hydrocarbon separations by selective adsorption.

Accordingly, it is an object of the invention to provide an improved method or process for separating of organic compound mixtures utilizing a fixed bed of particulate adsorbent for selectively adsorbing one or more constituents of the mixture. A further object is to provide an improved process for separating hydrocarbon mixtures of components of similar boiling range by selectively adsorbing one component thereof. Another object is to provide a process for selectively adsorbing and recovering more readily adsorbable constituents of a hydrocarbon mixture in a selected adsorbent with increased loading of the adsorbent and resulting increased efficiency. An additional object is to provide an improved process for separating n-paraffins from a mixture thereof with non-normal paraffins by selective adsorption in a fixed bed of particulate solid adsorbent, such as a molecular sieve. Other objects of the invention will become apparent to one skilled in the art upon consideration of the accompanying disclosure.

A broad aspect of the invention comprises passing a feed of a mixture of organic compounds A and B into an adsorption zone containing a fixed bed of adsorbent selective for component A so as to remove this component from the mixture and pass component B as effluent or raffinate from the bed until the bed is loaded and compoinent A begins to appear in increased concentration in the effluent, thereafter passing a second feed of similar composition but substantially richer in component A into the loaded bed of adsorbent so as to increase the loading of component A therein while recovering additional component B in the effluent until the concentration of component A in the effluent again increases, thereafter passing a purge fluid (not a constituent of the feed) thru the bed to first displace residual second feed (including components A and B) and thereafter to desorb component A from the bed, and separately recovering the displaced residual feed and the desorbed component A.

The invention is applicable to the separation of any mixture of organic compounds in which any component or system of components is selectively adsorbed on a specific adsorbent so as to leave a remaining component or component system unadsorbed as the raffinate. The adsorbed component is separately recovered by desorption as the other product of the operation. Thus, the process is applicable to the separation of alcohols, ketones, aldehydes, etc.; to the separation of certain types of hydrocarbons from other types; and to the separation of impurities from hydrocarbons, alcohols, ketones, aldehydes, etc. To illustrate, aldehydes may be separated from a mixture thereof with conjugated dienes including 1,3-butadiene, isoprene, piperylene, etc. The copending application of Ralph C. Farrar, S.N. 516,743, filed Dec. 27, 1965, discloses and claims the separation of aldehyde impurities, including formaldehyde, acetaldehyde, and propionaldehyde, from these conjugated dienes, particularly 1,3-butadiene.

The invention is particularly adapted to the separation of normal paraffinic hydrocarbons from non-normal paraffins, specifically, branched-chain hydrocarbons of similar boiling range, by adsorption of the n-paraffins on a molecular sieve adsorbent having an effective pore size of about 5 angstroms or in the range of 5 to 6 angstroms. The normal paraffins may range from $C_4$ to $C_{20}$ and higher in admixture with similar-boiling-range aromatics and/or branched-chain hydrocarbons. A preferred feed is a paraffinic naphtha having a boiling range of about 300–400° F. and containing $C_{10}$ to $C_{16}$ n-paraffins in a concentration in the range of about 10 to 50 volume percent, the remainder being principally branched-chain paraffins.

The feed is heated to a temperature in the range of 400 to 800° F. so as to vaporize same and the vaporized feed is passed thru a column packed with a fixed bed of adsorbent selective for the adsorption of the normal paraffins, such as a molecular sieve, at a pressure from atmospheric to about 500 p.s.i.g. and, preferably, in the range of 20 to 50 p.s.i.g. As the adsorption takes place, the effluent from the column is analyzed for normal paraffins, using a conventional analyzer such as a chromatograph or refractive index device. When the analyzer shows the appearance of n-paraffins in the effluent, indicating the adsorbent is substantially completely loaded under the conditions in the adsorber, feed to the column is cut off. Instead of passing a purge gas thru the column to purge the column of residual feed, which has substantially the same composition (concentration of n-paraffins) as the original feed, a second feed of higher n-paraffin concentration is passed into the column into contact with the adsorbent so that, because of the higher concentration of n-paraffins therein, the loading of the adsorbent with n-paraffins is increased until equilibrium is reached between the feed and the adsorbent. At this time n-paraffins pass out of the column in the effluent raffinate which has been substantially free of n-paraffins up to this point. Now, as the n-paraffin concentration in the raffinate is sensed by the analyzer and shown to be on sharp increase, the flow of the second feed (richer in n-paraffins) to the column is terminated. The fixed bed of adsorbent is now ready for the purging and desorption steps.

A purge gas is passed into the column, preferably from the downstream end thereof, so as to expel unadsorbed second feed, richer in n-paraffins than the first feed and also containing some unavoidably desorbed n-paraffins. This displaced second feed, richer in n-paraffins, is stored for use as the second feed to the column or it is passed to another column in a series of columns conventionally utilized in continuous operation, this other column being in that portion of the cycle in which it is ready for the step of contacting the bed of adsorbent with the second feed, richer in the adsorbable component.

Following completion of displacement of the second feed from the column, which is readily determined by analyzing the effluent during the purge step by a suitable analyzer, injection of the purge gas which now serves as an eluent or desorbing gas is continued. The concentration of the adsorbed component(s) now goes up to a maximum level such as 95 to 99 percent and this stream is recovered as the separated product. The eluent or desorbing gas is passed thru the column until substantial desorption has been accomplished as determined by the analyzer in the effluent line during this step. The extent of desorption to be practiced is a matter of economics and within the skill of the art. The desorption step is also a regeneration step which reconditions the adsorbent for another first-feed contacting step and repetition of the complete cycle adsorbing from the first feed, from the second and richer feed, purging of the second feed from the column, and desorption of the adsorbed material from the column.

The system is usually operated in vapor phase but it is also feasible to operate in liquid phase with some types of feeds and with certain adsorbents. Normally, the column is operated under isothermal conditions, all the fluids fed to the adsorbent bed being at substantially the same temperature, although some variation in this procedure is within the skill of the art. Suitable purge and eluent gases include nitrogen, methane, $CO_2$, helium, and other inert gases, which are usually heated to the temperature of the column before being injected.

A more complete understanding of the invention may be had by reference to the accompanying schematic drawing which is a flow scheme of the process and an arrangement of apparatus suitable for effecting the invention.

Referring to the drawing, adsorption column 10 is filled with a fixed bed of a selected adsorbent for the particular process to be performed. Inlet line 12 for the principal feed leads into the lower end of the column and is provided with a valve 14 and a heater 16. An effluent line 18 connects with the upper end of the column and is provided with a valve 20 and a condenser 22. Line 18 leads into a raffinate storage tank 24 from which product take-off line 26 leads. Valved line 28 leading from the top of storage tank 24 effects drawing off of light gases. A suitable analyzer 30, such as a chromatograph or refractive index instrument, is connected by sampling line 32 with line 18 for withdrawing a sample either continuously or at spaced intervals.

Purge gas line 34 connects with the upper end of column 10 and is provided with valve 36 and heater 38. During injection of gas or other fluid thru line 34, effluent passes thru line 40, containing valve 41, either into branch line 42 or branch line 44 for passage of fluid to storage tank 46 or storage tank 48, respectively.

A suitable analyzer 50 connected with line 40 by a sampling line operates a three-way valve 52 thru analyzer-recorder-controller 54 which has a set point for the particular concentration of the adsorbed component determining the operation of valve 52 to control flow into lines 42 and 44. To illustrate, when the concentration of desorbed component of the feed reaches 98 percent, analyzer 50 senses this condition and sends a signal in conventional manner to controller 54, which operates the three-way valve, to cut off flow into line 44 and switch the flow to line 42. A cooler or condenser 56 in line 42 and a similar condenser 58 in line 44 convert the steams in these lines to principally liquid for easy storage. Valved product line 60 removes product from storage tank 46 and valved line 62 provides for withdrawal of uncondensed gas or vapor, principally the purge or eluent gas which is normally recycled to line 34.

Line 64 connects tank 48 with the bottom of column 10 thru a section of line 12 intermediate valve 14 and heater 16. Line 64 is provided with a control valve 66. Heater 16 in line 12 heats the feed from line 64, as well as the feed passing thru valve 14, to column temperature.

In operation, the feed being separated into two components or two systems of components is fed thru line 12 into column 10 which contains a fixed bed of a solid particulate adsorbent which selectively adsorbs one or more components of the feed and passes other components into effluent line 18 into storage tank 24. This adsorbing step is continued until analyzer 30 senses a rather sudden rise in the concentration of the normally adsorbed component in this raffinate stream. When operating in the recovery of n-paraffins from a mixture thereof with principally branched-chain paraffins of similar boiling range, a concentration of n-paraffins in the range of about 0.5 to 2.0 volume percent is used to determine the feed cut-off point by closing valve 14 in line 12. The raffinate is normally substantially free of n-paraffins and the rise in concentration is rather abrupt, giving a good indication of cut-off point.

Following the adsorption step, valve 66 in line 64 is opened and a mixture similar to that in line 12 but substantially richer in n-paraffins collected in tank 48, previously, is fed into column 10. Because of the higher concentration of n-paraffins in this second feed, additional n-paraffins are adsorbed, thereby effecting a higher loading of the adsorbent than is normally achieved (using only the feed from line 12). Again, when the concentration of n-paraffins in the raffinate in line 18 shows a sudden marked increase as indicated by analyzer 30, valve 66 is closed and the column is ready for purging the column and adsorbent of the second feed (already richer in n-paraffins than the original feed in line 12). The purging is effected by introducing nitrogen or other suitable purge gas to the upper end of the column thru line 34 by opening valve 36, valve 20 being closed. The purge gas is heated in heater 38 to column temperature. As the purge gas displaces the rich feed from tower 10, some desorption of the n-paraffins is unavoidable, thereby increasing the richness of the displaced rich, second feed and improving the quality of this displaced material as feed for the second phase of the adsorption to effect higher loading of the adsorbent. During the purging, analyzer 50 senses the concentration of the desorbed component in the stream in line 40 and, when this reaches a selected level, such as 98 volume percent, which is controlled by the set point of instrument 54, and this instrument operates three-way valve 52 to cut off flow from line 40 into line 44 and divert the flow to line 42 and desorbed product tank 46.

It is to be realized that during the purging phase, before concentration of the desorbed material reaches the selected level, the displaced or purged second feed containing added desorbed component passes thru line 44 into rich feed tank 48 for use as the rich, second feed to the column. The change in concentration of the adsorbed component in line 40 rises suddenly at the time when the displaced second feed passes analyzer 50, thereby permitting good control of this phase of the process. To illustrate, in separating n-paraffins from a mixture thereof with branched-chain paraffins in which the concentration of n-paraffins is about 20 percent, the concentration of n-paraffins in the stream in line 40 during the purge step will run around 22 to 23 percent or even higher. When the rich, second feed displaced from adsorber 10 has completely passed analyzer 50, the concentration of n-paraffins in the succeeding stream will rise abruptly to substantially 98 percent, thereby providing an excellent indication for switching three-way valve 52 to pass the high-purity n-paraffin stream to product tank 46. When the concentration of n-paraffins falls off to a selected low level, indicating substantial desorption and regeneration of the adsorbent in column 10, valves 36 and 41 in lines 34 and 40, respectively, are closed and valves 14 and 20 in lines 12 and 18, respectively, are opened so as to again initiate the adsorption phase of the cycle and, thereafter, the other phases of the cycle are repeated in the same order.

The data presented below in Table I illustrate the separation of n-paraffins from a mixture thereof with branched-chain paraffins of substantially the same boiling range ($C_{10}$ to $C_{16}$ paraffinic naphtha boiling range of 300 to 400° F.; 20 wt. percent n-paraffins—remainder principally branched-chain paraffins) in accordance with prior practice.

The data in Table II illustrate practice in accordance with the invention. In prior art practice the purge or displaced feed from the previous cycle is blended or mixed with the fresh feed and the resulting mixture is passed to the column for the adsorption step of the cycle. The invention separately collects the purge or displaced feed at the end of the adsorption step and feeds this material, richer in n-paraffins than the regular feed, to the adsorption column as a second feed. Thus, in contrast, the invention passes the fresh feed, alone, into the adsorber until the adsorbent is saturated with n-paraffins and the purge material (richer in n-paraffins than the fresh feed) is then passed into the adsorber to increase the loading on the adsorbent.

It is to be understood that general operating conditions of adsorption process to which this invention is applicable are conventional and need not be delineated here. The invention lies in the novel sequence of operating steps and in the recovery and use of the rich second feed passed to the adsorber following the regular feed pass, together with the separate recovery thereof.

The analyzer instruments are commercially available. These instruments may be arranged and connected to automatically control the various feeds to the column in conventional manner, if desired.

Certain modifications of the invention will become apparent to those skilled in the art and the illustrative details disclosed are not to be construed as imposing unnecessary limitations on the invention.

I claim:

1. A process for separating a feed mixture of organic components A and B which comprises the steps of:

(1) passing said feed mixture into a fixed bed of adsorbent selective for component A, thereby removing component A from the mixture and loading said adsorbent therewith, the effluent from said bed being component B relatively free of component A;

(2) continuing step (1) until said adsorbent is loaded at the respective concentrations of components A and B in said feed mixture and a substantial increase in concentration of component A first occurs in said effluent;

(3) thereafter, passing a second feed of similar composition to said mixture, but substantially richer in component A, into the loaded bed of adsorbent, thereby increasing the loading of component A therein while recovering additional component B;

(4) continuing step (3) until the concentration of component A in the effluent component B again increases, indicating a higher loading of component A than in step (2), and then terminating step (3);

(5) thereafter, passing a purge fluid not a constituent of said feed thru said bed to first displace residual second feed and thereafter to desorb component A; and (6) separately recovering the displaced residual feed and the desorbed component A of step (5).

2. The process of claim 1 wherein separately recovered displaced feed of step (6) is the second feed of step (3).

3. The process of claim 1 wherein component A is at least one normal paraffin and component B is at least one-normal hydrocarbon of similar boiling point to that of A.

TABLE I (OLD METHOD).—UNITS IN POUNDS PER 1,000 POUNDS 5A MOLECULAR SIEVE

| | Feed | | | Raffinate | Purge | N-paraffin Product |
|---|---|---|---|---|---|---|
| | Fresh | Purge | Mix Feed | | | |
| N-paraffins | 11 | 4 | 15 | 1 | 4 | 10 |
| Branched paraffins | 44 | 6 | 50 | 44 | 6 | 0.1 |
| | 55 | 10 | 65 | 45 | 10 | 10.1 |

TABLE II (NEW METHOD)

| | Feed | | | Raffinate | Purge | N-paraffin Product |
|---|---|---|---|---|---|---|
| | Fresh | Purge | Total Feed | | | |
| N-paraffins | 13 | 6 | 19 | 1 | 6 | 12 |
| Branched paraffins | 52 | 4 | 56 | 52 | 4 | 0.1 |
| | 65 | 10 | 75 | 53 | 10 | 12.1 |

Thus, the recovery of n-paraffins per cycle of operation has been increased from 10.1 to 12.1 pounds per 1000 pounds of adsorbent, which is a 20% increase per cycle.

4. The process of claim 1 wherein component A is a mixture of normal paraffins of at least 4 carbon atoms per molecule and component B is a mixture of non-normal hydrocarbons having about the same boiling range as said normal hydrocarbons, said feeds are vaporized, and said fixed bed is operated under substantially isothermal conditions.

5. The process of claim 1 wherein said adsorbent is a zeolitic molecular sieve 5 to 6 angstrom pore size, said component A is a mixture of $C_{10}$ to $C_{16}$ normal paraffins in a concentration in the range of 10 to 50 weight percent of the mixture, component B is principally branched-chain hydrocarbons of similar boiling range, said feeds and said purge fluid are heated to substantially the same temperature in the range of 400 to 800° F., and said fixed bed is operated under substantially isothermal conditions at a pressure in the range of atmospheric to 500 p.s.i.g.

6. The process of claim 4 wherein said adsorbent is a molecular sieve of 5 to 6 angstrom pore size, said feeds and said purge fluid are in gaseous form at a temperature in the range of 400 to 800° F., and separately recovered displaced feed of step (6) is the second feed.

7. The process of claim 6 wherein the purge fluid is nitrogen, methane, helium, or $CO_2$.

8. The process of claim 5 wherein the purge fluid is nitrogen, methane, helium, or $CO_2$.

9. The process of claim 5 wherein steps (1) and (2) are terminated when the concentration of component A in the effluent is in the range of 0.5 to 2.0 volume percent.

References Cited

UNITED STATES PATENTS

| | | | |
|---|---|---|---|
| 2,963,519 | 12/1960 | Kasperik et al. ------ | 260—676 |
| 3,184,518 | 5/1965 | Sanders et al. ------ | 208—310 |
| 3,268,440 | 8/1966 | Griesmer et al. ----- | 208—310 |

HERBERT LEVINE, *Primary Examiner.*

UNITED STATES PATENT OFFICE

CERTIFICATE OF CORRECTION

Patent No. 3,365,394 January 23, 1968

John E. Cottle

It is certified that error appears in the above identified patent and that said Letters Patent are hereby corrected as shown below:

Column 6, line 74, "one-normal" should read -- one non-normal --.

Signed and sealed this 14th day of October 1969.

(SEAL)
Attest:

Edward M. Fletcher, Jr.
Attesting Officer

WILLIAM E. SCHUYLER, JR.
Commissioner of Patents